United States Patent [19]
Ayers

[11] Patent Number: 6,024,229
[45] Date of Patent: Feb. 15, 2000

[54] REUSABLE FILTER ASSEMBLY

[76] Inventor: William R. Ayers, P.O. Box 885, West Union, S.C. 20696

[21] Appl. No.: 09/032,538

[22] Filed: Feb. 27, 1998

[51] Int. Cl.$^7$ .................................................. B01D 27/00
[52] U.S. Cl. .......................... 210/443; 210/450; 210/451; 210/453; 210/DIG. 17
[58] Field of Search .................... 210/323.2, DIG. 17, 210/450, 441, 443, 232, 238, 453; 55/502, 510

[56] References Cited

U.S. PATENT DOCUMENTS

| | | |
|---|---|---|
| 2,262,628 | 11/1941 | Wilson . |
| 2,360,020 | 10/1944 | Skinner et al. . |
| 3,211,292 | 10/1965 | Bull . |
| 3,217,942 | 11/1965 | Humbert, Jr. et al. . |
| 3,282,429 | 11/1966 | Wood et al. . |
| 3,487,932 | 1/1970 | Forrester et al. . |
| 4,622,136 | 11/1986 | Karcey . |
| 4,832,844 | 5/1989 | Ayers . |
| 4,969,994 | 11/1990 | Misgen et al. . |
| 5,066,318 | 11/1991 | McDonough . |
| 5,066,391 | 11/1991 | Faria . |
| 5,104,537 | 4/1992 | Stifelman et al. . |
| 5,301,958 | 4/1994 | Covington . |
| 5,342,519 | 8/1994 | Friedmann et al. . |
| 5,390,701 | 2/1995 | Lessley et al. . |
| 5,399,264 | 3/1995 | Pulek et al. . |
| 5,548,893 | 8/1996 | Koelfgen . |
| 5,569,373 | 10/1996 | Smith et al. ............................... 210/90 |
| 5,637,215 | 6/1997 | Albers, Jr. . |
| 5,643,448 | 7/1997 | Martin et al. . |
| 5,698,093 | 12/1997 | Pyle et al. . |

*Primary Examiner*—W. L. Walker
*Assistant Examiner*—Marianne S. Ocampo
*Attorney, Agent, or Firm*—Rockey, Milnamow & Katz, Ltd.

[57] ABSTRACT

A filter assembly particularly suited for a gasoline fuel pump includes a reusable filter element. The filter assembly has a surrounding housing and a base portion. The base portion including a surface for supporting the filter element and a central stand pipe having a thread formation for engaging an outlet tube of an adapter mounted to the top of the housing. Engagement of the stand pipe to the outlet tube pressing a sealing surface of the housing to a sealing surface of the adapter. The filter element can be retained by a retaining ring threaded onto the stand pipe or by a retaining ring assembly which functions to retain the filter element and also to provide sealing surfaces between the housing, the retaining ring assembly and the adapter. The base can also be made unitary with the housing.

11 Claims, 3 Drawing Sheets

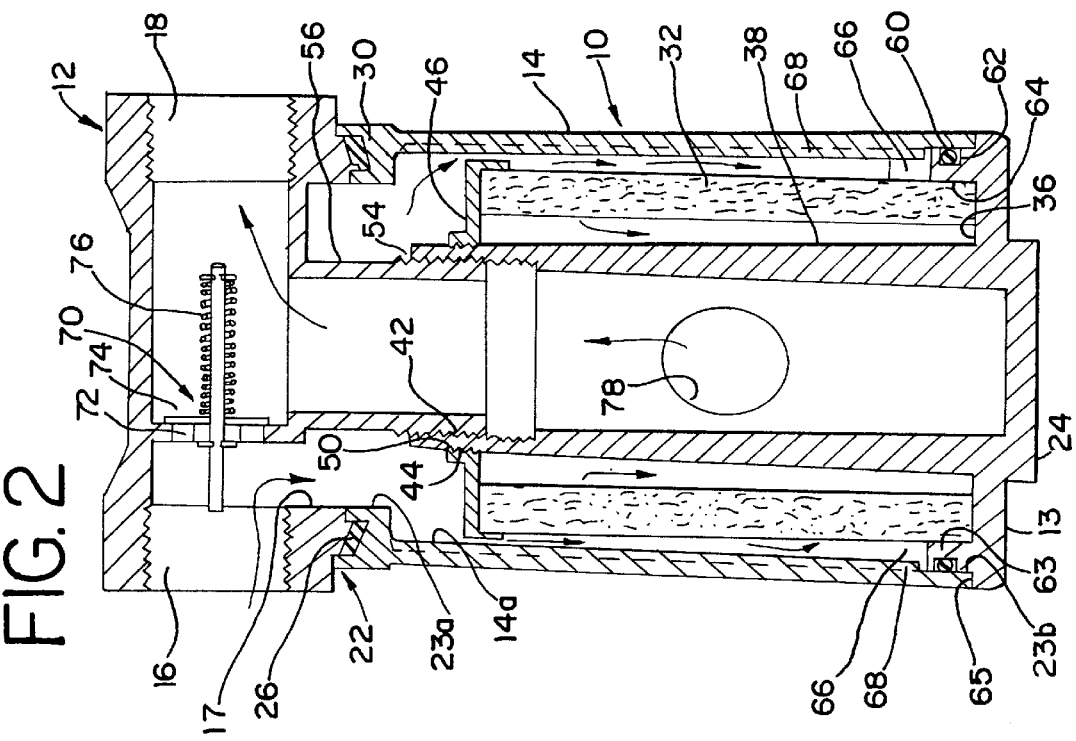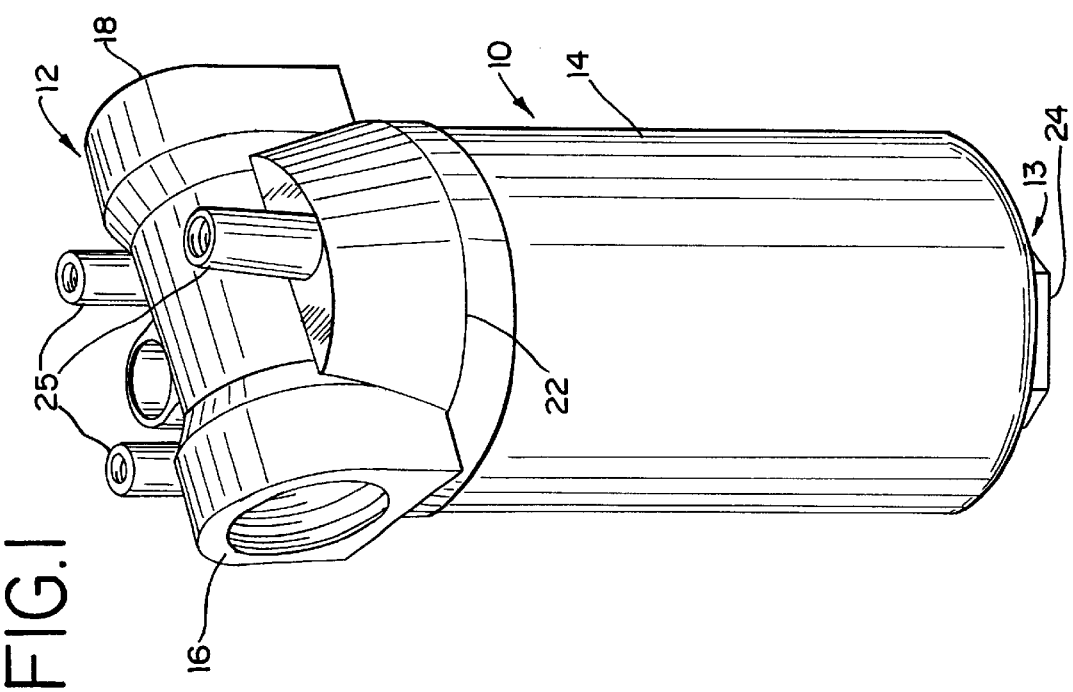

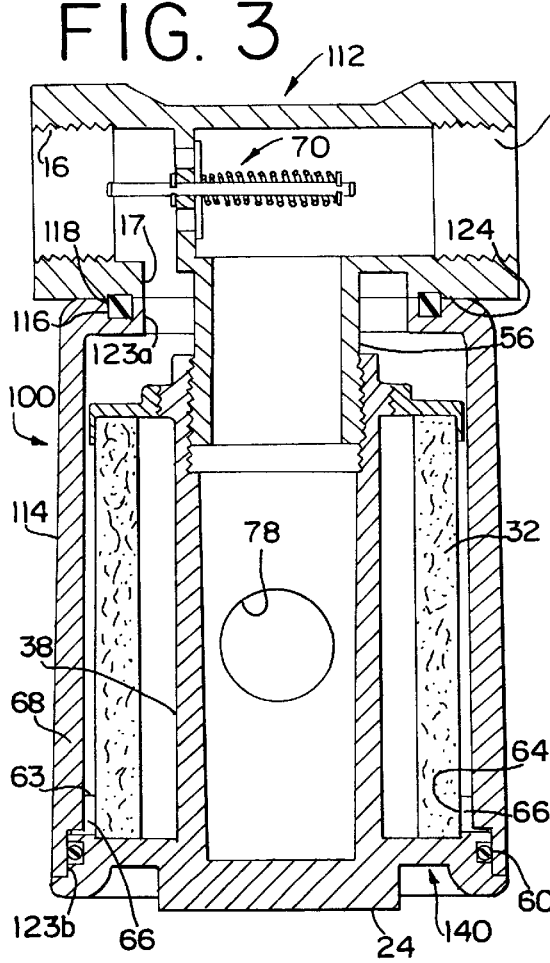
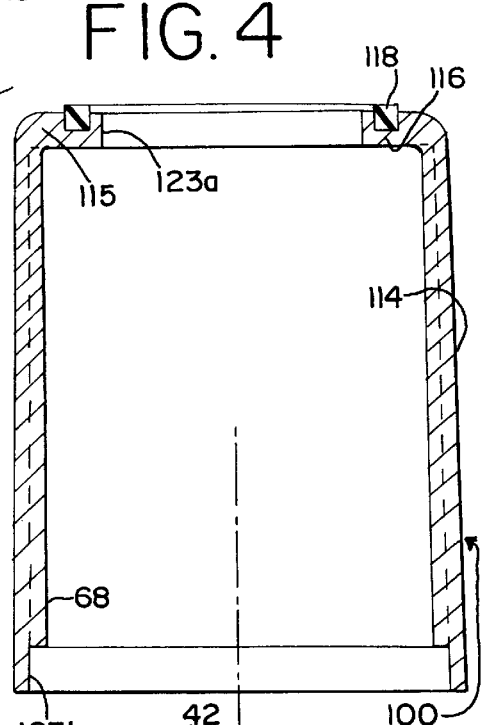
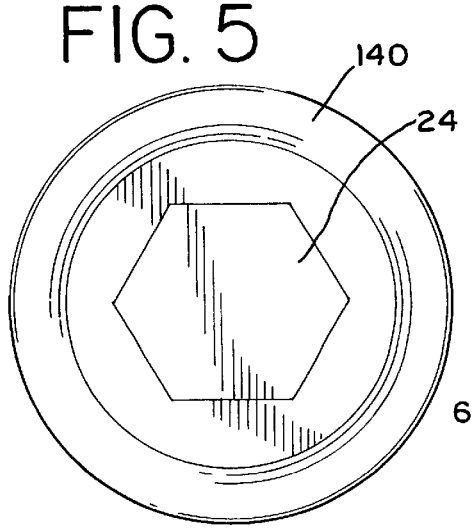
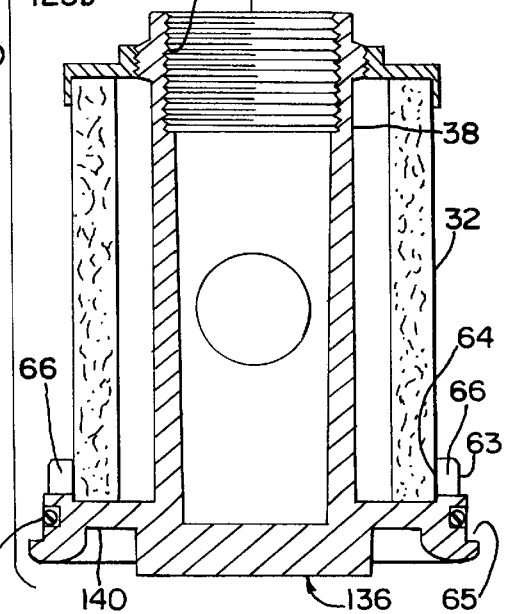

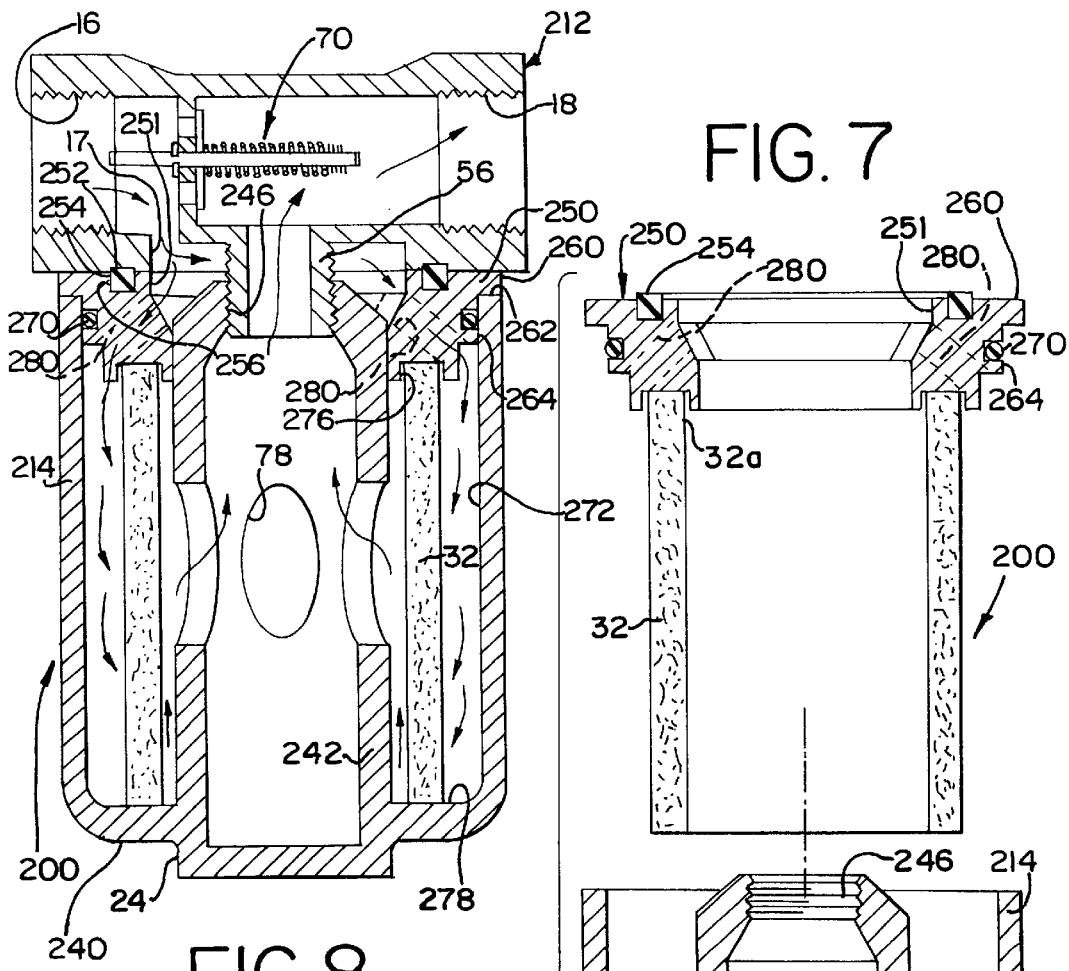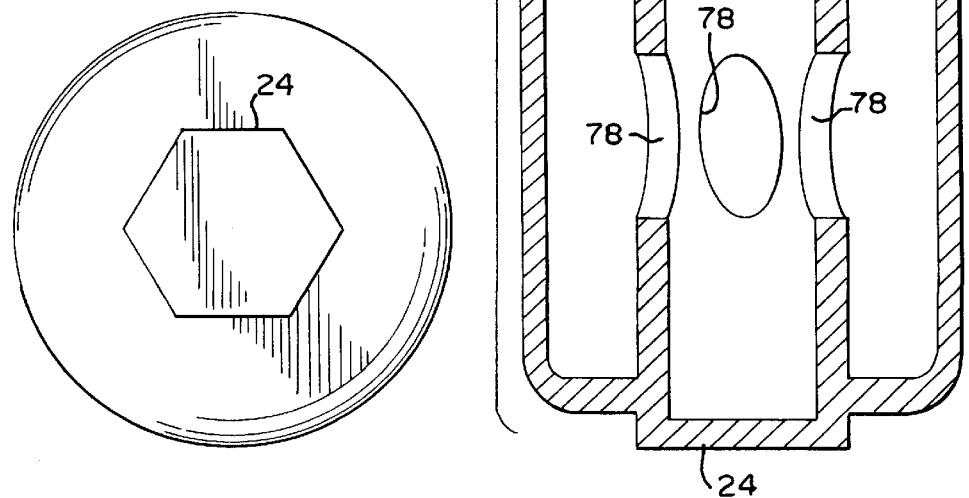

REUSABLE FILTER ASSEMBLY

TECHNICAL FIELD OF THE INVENTION

The present invention relates to filter units, and particularly to a gasoline filter assembly for a gasoline dispensing pump having a replaceable filter element.

BACKGROUND OF THE INVENTION

Filtration is the removal of contaminants from a fluid. Fuels, engine oil, transmission and hydraulic fluids and coolants are some fluids that require removal of contaminants that could cause damage to their respective mechanical systems.

Typically, oil filtering devices for automotive engines are embodied as disposable spin-on type filters. Spin-on filters are also used for gasoline filtration at gasoline dispensing pumps. Filtration at gasoline pumps was developed in the 1950's as a quality control feature to reduce contaminants in dispensed gasoline, which contaminants accumulated during handling and storage. Spin-on filters were introduced as an option inside the gasoline pump or on the hand held gasoline dispenser in the early 1960's and have evolved to become a standard feature. These spin-on type filters are each composed of a metal housing enclosing a filter element.

With approximately 400 million spin-on filters manufactured annually, disposal of these filters is environmentally disadvantageous as both a pollution hazard and a volume problem, taking up valuable space in landfills. One solution to alleviate this problem is the recycling of steel components of the spin-on type filters. However, recycling is costly in material handling and requires disposal or incineration of the volatile components absorbed by the filter, and the nonrecyclable contaminated portions of the filter.

Whether in an engine, transmission, gas pump, or in a hydraulic system, a filter adapter is either an integral part of, or mechanically connected to the respective mechanical system. Typically, the filter adapter has a male threaded center post with a concentric flat gasket seal surface. The filter adapter is located and oriented in order for the spin-on filter to have a threaded engagement onto the male center post. A gasket carried by the spin-on filter seals on the flat gasket seal surface of the adapter. Liquid enters the filter in ports that are located between the gasket seal surface and the center post. From the ports the liquid is directed to an outside of the filter element. The liquid is then filtered through the filter media of the filter element, which removes contaminants. The liquid is then diverted through the center section of the filter element and exits the spin-on filter through the center post.

An effective reusable filter assembly would also be configured to screw onto (spin onto) the center post of such a filter adapter.

Some known reusable filter mechanisms have a central threaded port for engagement with the center post of a filter adapter, but which also require a secondary threaded joint to secure and seal the filter housing. U.S. Pat. Nos. 5,342,519; 5,066,391; 5,569,373; and 4,622,136 disclose filter housings which must be unscrewed at the secondary threaded joint to replace the filter element held within the housing.

It would be advantageous to provide a filter assembly which provides a housing with a minimum number of external threaded joints and which would tightly seal the filter assembly to the filter adapter, while providing a convenient means of replacing filter elements. It would be advantageous if such a filter assembly comprised a minimum number of components and was cost effectively produced.

SUMMARY OF THE INVENTION

The present invention includes a reusable filter assembly which has a cylindrical housing and a base. The base serves as a closing end cap to the housing, and serves as a filter element support. In one embodiment the housing and base are separate elements, sealed together by an O-ring. In another embodiment, a unitary housing and base, as a single casting, serve as a surrounding housing and a closing end cap, and as a filter element support. The casting surrounds the filter element. The base in both embodiments includes a stand pipe which serves to support the filter assembly from the adapter, serves to tightly seal the housing and base to the adapter, and serves to channel filtered liquid from the filter assembly to the adapter.

The stand pipe has a radial opening for passing liquid from outside the stand pipe to inside the stand pipe. The stand pipe includes an integral thread at its top open end to engage the center post of the filter adapter. The stand pipe can include an external thread to engage a filter retaining ring which holds the filter element onto the base. The stand pipe serves as the main support structure or connector of the filter assembly to the filter adapter, and also as a support against inwardly directed radial pressure on the filter element. This pressure increases as the filter element becomes more flow restrictive over its useful life and would otherwise tend to radially collapse the filter element.

In the first embodiment, sealing between the housing and the base is accomplished by a static axial O-ring seal carried by the base. The O-ring has an interference fit with an inside surface of the housing. The O-ring interference fit also serves as a mechanism to keep the assembly together during removal and reinstallation.

The filter assembly of the first embodiment tightens up into a sealed configuration when installed and spin-tightened on the filter adapter. The first embodiment housing has internal ribs or tabs which engage slots in the base to assure non-rotation of base and housing relative to each other as the filter assembly is either installed or uninstalled. This feature is an advantageous development as rotation of surfaces against the O-ring can possibly cause bunching of the O-ring seal and ultimate seal failure.

In the second mentioned embodiment, the base and housing are formed in a unitary configuration, thus eliminating an external joint between housing and base. Minimizing external joints reduces leakage sites.

A hex nut can be cast on the bottom of the base of either embodiment to facilitate the removal of the filter assembly with a wrench.

The filter element can be of various types. It can be of a disposable media with molded or metallic end structures and center support. The preferred filter element would be constructed of a reusable stainless steel or synthetic mesh with molded or metallic end structures and center support.

Spin-on replacement filters are typically configured having a machined, cast base that screws onto the existing filter adapter, such as described in U.S. Pat. Nos. 5,342,519, 5,569,373, 5,066,391, 5,569,373, and 4,622,136. However, as described in these patents, a second external threaded joint is required for removal and cleaning of the filter element. In contrast, according to one embodiment of the invention, the threaded joint between the stand pipe and the center post of the filter adapter is utilized for filter removal. After the threaded joint is disengaged, the assembly slides apart for cleaning of the filter element. The process can be reversed for installation of a clean filter element. Alternately, an internal, threaded retainer can be used to hold the filter element. This threaded retainer is located within the sealed housing so as not to add a further external threaded joint.

Numerous other advantages and features of the present invention will become readily apparent from the following detailed description of the invention and the embodiments thereof, from the claims, and from the accompanying drawings in which the details are fully and completely disclosed as part of the specification.

BRIEF DESCRIPTION OF THE DRAWINGS

FIG. 1 is a perspective view of a first embodiment filter assembly of the present invention connected to an adapter;

FIG. 2 is a sectional view taken generally along line 2—2 from FIG. 1;

FIG. 3 is a longitudinal sectional view of a first alternate embodiment of the present invention connected to an adapter;

FIG. 4 is an exploded sectional view of the filter assembly shown in FIG. 3;

FIG. 5 is a bottom view of the filter assembly shown in FIG. 3;

FIG. 6 is a longitudinal sectional view of a second alternate embodiment of a filter assembly connected to an adapter; and FIG. 7 is an exploded sectional view of the filter assembly shown in FIG. 6; and FIG. 8 is a bottom view of the filter assembly shown in FIG. 6.

DETAILED DESCRIPTION OF THE PREFERRED EMBODIMENTS

While this invention is susceptible of embodiment in many different forms, there is shown in the drawings and will be described herein in detail, specific embodiments thereof with the understanding that the present disclosure is to be considered an exemplification of the principles of the invention to the specific embodiments illustrated.

FIG. 1 illustrates a filter assembly or filter canister 10 connected to a filter adapter 12, the assembly 10 including a base 13 and a filter housing 14. The base 13 is preferably a metallic casting of steel or aluminum. The adapter 12 includes a threaded inlet port 16, a bottom opening 17, and a threaded outlet port 18. The adapter 12 is sealingly connected to the housing 14 around a joint 22. The base 13 and the housing 14 are fashioned to be sealed and locked together rotationally as illustrated in FIG. 2. The base 13 and housing 14 are screwed onto or spun onto the adapter 12 and can be removed using a tool engageable with a hex formation 24 formed on the base 13. Screw sockets 25 are provided for supporting the filter assembly 10 from external structure, such as from a gasoline pump.

FIG. 2 illustrates the filter assembly 10 including an annular elastomeric seal element 26 having a generally rectangular cross-section, arranged at the joint 22 between the adapter 12 and the housing 14. The housing is shaped as an open ended cylinder having a top opening 23a and bottom opening 23b. The housing 14 can include an annular channel 30 having a U-shaped cross-section for holding the elastomeric element 26 in position for compression by mutual engagement between the adapter 12 and the housing 14.

A cylindrical filter element 32 is carried on a base surface 36 of the base 13. The base 13 also includes a central stand pipe 38 extending upwardly from the base surface 36. The central stand pipe 38 includes at its top end, an inside thread 42 and an outside thread 44. An element retaining ring 46 has an inside thread 50 engaged with the outside thread 44 such that the ring 46 can be advanced on to the stand pipe 38 to snugly retain the element 32 between the ring 46 and the base surface 36. The ring 46 can be spun off the stand pipe 38 to remove and replace the filter element 32. The inside thread 42 of the stand pipe 38 is threadingly engaged to an outside thread 54 of a center post or outlet tube 56 of the adapter 12.

The housing 14 is sealed to the base 13 by an O-ring 60 held within a channel 62 of the base 13 and which compresses against the inside surface 14a of the housing 14. The channel 62 is located on an outside surface of a rim 63. An inside surface 64 of the rim 63 centers the filter element 32 snugly within the rim 63. Extending outwardly from the rim 63 is an annular ledge 65 which underlies and supports the housing 14. The housing 14 is locked rotationally to the base 13 by virtue of housing ribs 68 which fit into slots 66 formed intermittently into the rim 63 which prevents relative rotation between the base 13 and the housing 14. In the illustrated embodiment two diametrically opposed ribs 68 and two diametrically opposed slots 66 are provided. Thus, the housing 14 and the base 13 can be spun together onto the adapter 12 by the engagement between the stand pipe 36 (at the threads 42) and the outlet tube 56 (at the threads 54). Progressive engagement of the stand pipe 38 and the outlet tube 56 retains the assembly together and forms seals at the elastomeric element 26 and at the O-ring 60. One or more radial ports 78 are also provided through the stand pipe 36.

A spring loaded relief valve 70 is provided between the threaded inlet port 16 and the threaded outlet port 18 such that a clogged filter can be directly bypassed by gasoline (or other fluid) flowing from the inlet port 16, passing through the relief valve port 72 upon lifting of the closure element 74 against pressure from the spring 76, and to the outlet port 18.

In operation, gasoline (or other liquid) to be filtered passes through the inlet port 16, through the opening 17, through the opening 23a of the housing 14, along the inside surface 14a of the housing around an outside of the filter element 32, through the filter element 32, through one or more radial ports 78 through a side wall of the stand pipe 38, up through the stand pipe 38, through the outlet tube 56 and through the outlet port 18.

FIGS. 3 through 5 illustrate a first alternate embodiment of the filter assembly 100 connected to a filter adapter 112. In this embodiment, a housing 114 is provided with a top wall 115 having an upward facing open, annular channel 116 having a rectangular cross-section and holding an annular elastomeric element 118 having a rectangular cross-section which, when the housing 114 is spun onto the outlet tube 56, is compressed against an underside surface 124 of the filter adapter 112 to seal the housing 114 to the adapter 112. The housing 114 has a top opening 123 or in registry with the opening 17 and a bottom opening 123b for receiving the O-ring 60 of the base 124.

As illustrated in FIGS. 3 and 5, a base 140 is formed of a different shape than that shown in FIG. 2, having the hex formation 24 slightly recessed. Also, the rim 63 has the inside surface 64 which centers the filter element 32.

As illustrated in FIG. 4, an inside of the housing 114 includes the ribs 68 which, when slipped down over the filter element 32, interlock into the slots 66 to prevent relative axial rotation between the housing 114 and the base 140. Thus the housing 114 and the base 140 can be spun on or off the adapter 112 together, i.e., without relative rotation therebetween.

FIGS. 6 through 8 illustrate a still further embodiment of the filter assembly 200 having a housing 214 which is formed unitary with a base 240. The assembly 200 is connected to a filter adapter 212. A stand pipe 242 extends from the base 240 upwardly and includes a plurality of radial ports through the stand pipe 242. The stand pipe 242 is formed unitary with the base 240.

Additionally, the stand pipe 242 includes a threaded outlet port 246 which is engaged by the threaded outlet tube 56 of the adapter 212, and has an inner diameter and an outer diameter, wherein the inner and outer diameters near the free end of said stand pipe is smaller than the inner and outer diameters near the end surface of said base.

The assembly 200 includes a seal-and-retaining ring 250 which is held against a sealing surface 252 of the adapter 212 via an annular seal ring 254 having a rectangular cross-section. The seal ring 254 is interfit between the sealing surface 252 and an annular channel 256 having a rectangular cross-section, and formed in the top of the retaining ring 250. The retaining ring 250 includes a top opening 251 in registry with the opening 17 of the adapter 123. The retaining ring 250 includes an annular flange 260 which is pressed by a top annular surface 262 of the housing 214 as the stand pipe 242 is progressively screwed onto the outlet tube 56. The retaining ring 250 includes an outwardly facing channel 264 which holds an annular side O-ring 270 having a circular cross-section, which is compressed against an inside surface 272 of the housing 214 when the housing 214 and retaining ring 250 are assembled.

The retaining ring 250 includes a downwardly facing annular channel 276 having a rectangular cross-section which receives a top end 32a of the tubular or cylindrical filter element 32. The tubular filter element 32 is thus held between the channel 276 and an inside surface 278 of the base 240.

In this further embodiment, no internal screwed filter element retaining ring is needed, thus eliminating a further step in replacing a filter element. Once the housing 214 is removed from the adapter 212, the retaining ring 250 and the filter element 32 can be slid out of the housing 214 and separated. A plurality of flow channels 280 are arranged through the retaining ring 250. Fluid will pass from the inlet port 16, through the opening 17, and through the top opening 251 of the ring 250, through the ports 280 and to an outside of the filter element 32. The ports are substantially radially extending, cylindrical passages.

The invention provides in all three embodiments a single external threaded connection which causes the tightening and sealing of the entire filter assembly to the adapter. In the first two embodiments an O-ring is provided to seal between separate housing and base components. In the last embodiment, the base and housing are formed unitarily without a joint or seam therebetween.

From the foregoing it will be observed that numerous variations and modifications may be effected without departing from the spirit and scope of the invention. It is to be understood that no limitations with respect to the specific apparatus illustrated herein is intended or should be inferred. It is, of course, intended to cover by the appended claims all such modifications as fall within the scope of the claims.

What is claimed is:

1. A reusable filter assembly for mounting to a filter adapter, the adapter having an inlet port, an outlet port, a flow channel flow connected to receive fluid from said inlet port, a sealing surface surrounding said flow channel, and an outlet tube flow connected to said outlet port, the filter assembly comprising:

a housing having a surrounding side wall and a first end wall portion with an opening, and a housing sealing surface surrounding said opening;

a base connected to said housing at an end opposite said first end wall portion, said base having an end surface and a stand pipe extending perpendicularly from said end surface through said surrounding side wall of said housing generally to said first end wall portion and terminating at a free end of said stand pipe, and said stand pipe having at least one radial port therethrough, and having an inner diameter and an outer diameter, wherein the inner and outer diameters near the free end of said stand pipe is smaller than the inner and outer diameters near the end surface of said base;

a cylindrical filter element held within said housing and carried on said end surface and surrounding said stand pipe, said filter element sized to be removable from said housing through said opening, and said stand pipe extending through said cylindrical filter element;

said filter assembly including a removable retaining element holding said filter element onto said end surface and extending generally about said free end of said stand pipe, and said retaining element further having substantially radially extending ports therethrough;

said stand pipe having a first threading formation at said free end thereof engageable to a second threading formation formed on the outlet tube;

progressive engagement of said first and second threading formations pressing said housing and adapter sealing surfaces together to cause sealing between said housing and said adapter without threaded engagement of said housing and said adapter.

2. The filter assembly of claim 1 further comprising an O-ring seal arranged between said housing and said base.

3. The filter assembly of claim 1 wherein said housing and said base have a unitary, one-piece construction.

4. The filter assembly of claim 1, comprising a seal element arranged between said base and said housing, wherein said base extends radially outwardly of said housing and is slidably engaged to an end of said housing.

5. The filter assembly of claim 1 comprising an annular sealing element interposed between said housing and adapter sealing surfaces.

6. The filter assembly of claim 5 wherein one of said housing and adapter sealing surfaces comprises an annular channel for holding said annular sealing element.

7. The filter assembly of claim 1 wherein said removable retaining element is threadingly engaged to said stand pipe.

8. The filter assembly of claim 1 wherein said removable retaining element is clamped between said surrounding side wall and said adapter when said housing sealing surface is pressed to said adapter sealing surface.

9. The filter assembly of claim 8 wherein said housing sealing surface is located on said removable retaining element.

10. A filter assembly comprising:

a filter element canister having a support surface for supporting a filter element, said canister having a surrounding side wall, an inlet top opening, a first sealing surface around said inlet top opening, and a first outlet tube extending from said support surface along the length of said surrounding side wall and having a radial opening therethrough;

an adapter having an inlet port, an outlet port, a flow channel flow connected to said inlet port, a second sealing surface surrounding said flow channel, and a second outlet tube flow connected to said outlet port;

said first outlet tube progressively engageable to said second outlet tube to press said first sealing surface to said second sealing surface; and said inlet top opening flow connected to said flow channel, and said first outlet tube flow connected to said second outlet tube, said canister including a cylindrical housing and a base, said base including said support surface, said first outlet tube extending from said base, and a filter element supported on said base and surrounding said first outlet tube, and a retaining element which is screw threadedly engaged to said first outlet tube, said retaining element holding said filter element between said retaining element and said base and one of said cylindrical housing and said base includes at least one rib, and the other of which includes an element to interlock with said rib to limit relative rotation between said cylindrical housing and said base.

11. The filter system of claim 10 wherein said canister includes a housing cylinder and a base, said base including said support surface and an O-ring seal to said housing cylinder.

* * * * *

UNITED STATES PATENT AND TRADEMARK OFFICE
CERTIFICATE OF CORRECTION

PATENT NO.: 6,024,229

DATED : February 15, 2000

INVENTOR(S): William R. Ayers

It is hereby certified that error appear(s) in the above-identified patent and that said Letters Patent is hereby corrected as shown below:

In column 4, line 4, "on to" should be --onto--;

In column 5, line 6, after "ports" insert --78--;

In column 5, line 22, "123" should be --12--.

Signed and Sealed this

Sixteenth Day of January, 2001

Attest:

Q. TODD DICKINSON

*Attesting Officer*  *Commissioner of Patents and Trademarks*